April 1, 1958
J. F. ENGLER
2,828,968
WHEEL HEIGHT ADJUSTMENT
Filed Sept. 8, 1955
2 Sheets-Sheet 1
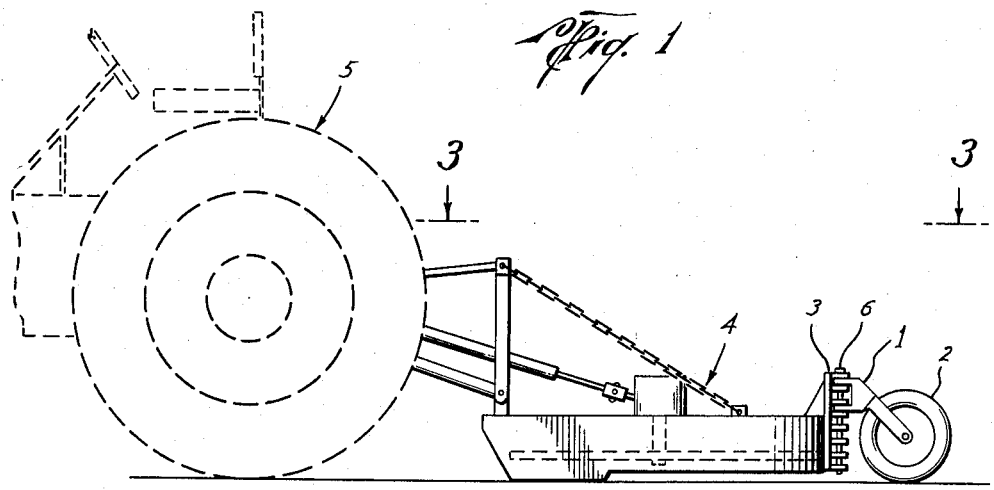
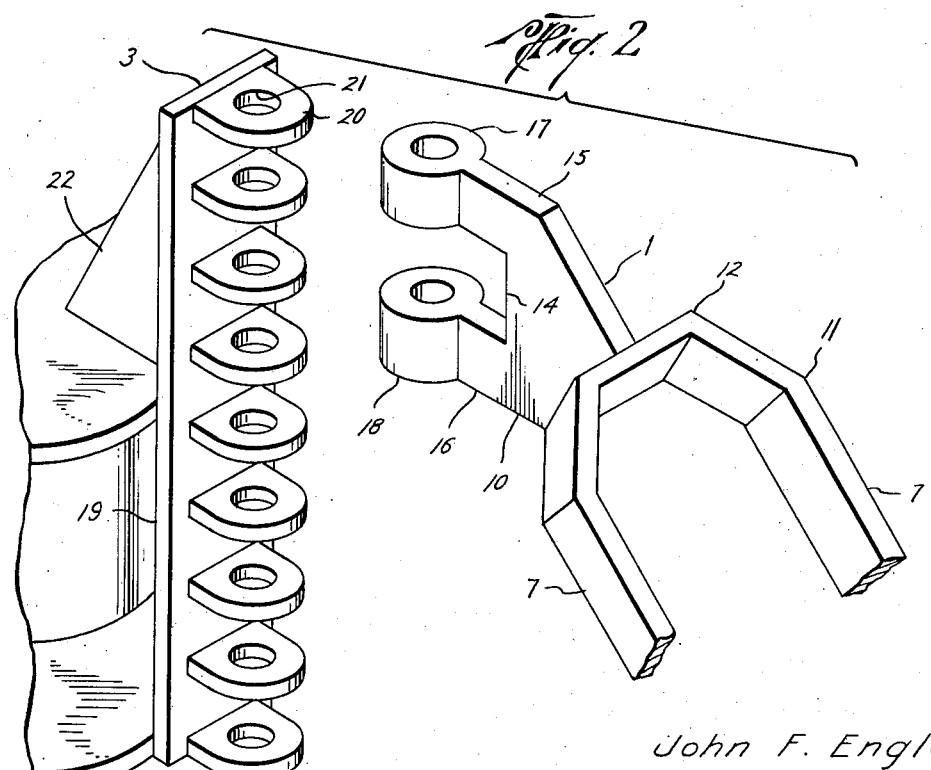
John F. Engler
INVENTOR.
BY
ATTORNEY April 1, 1958 J. F. ENGLER 2,828,968
WHEEL HEIGHT ADJUSTMENT
Filed Sept. 8, 1955 2 Sheets-Sheet 2
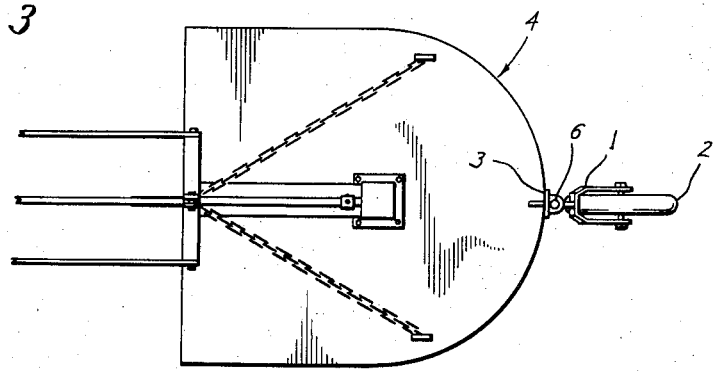
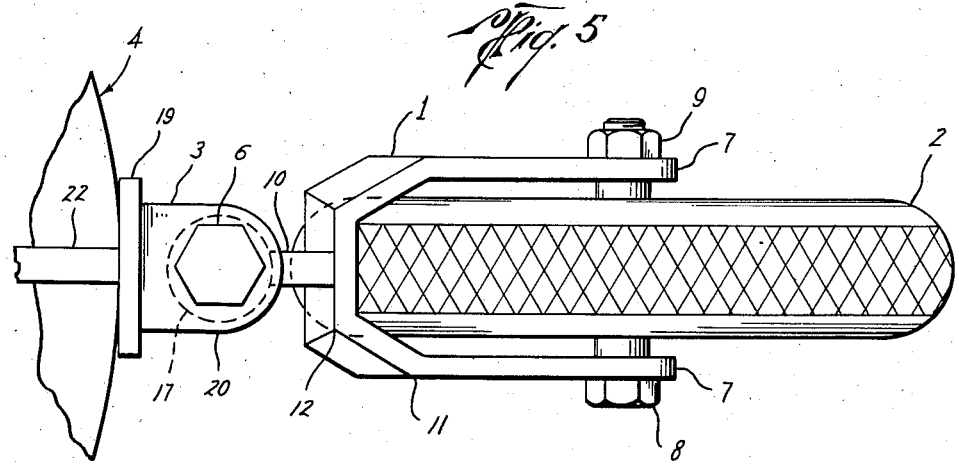
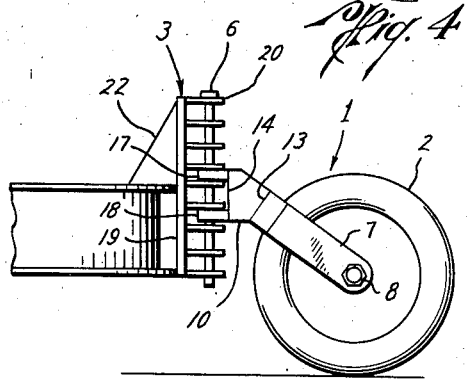
John F. Engler
INVENTOR.
BY
ATTORNEY United States Patent Office 2,828,968
Patented Apr. 1, 1958

2,828,968
WHEEL HEIGHT ADJUSTMENT
John F. Engler, Houston, Tex.
Application September 8, 1955, Serial No. 533,139
4 Claims. (Cl. 280—43)

This invention pertains to a wheel height adjustment device and particularly to a wheel height adjustment device for use on mowing devices whereby the height of cut of the mowing device may be adjusted.

In mowing devices it is desirable to have a simple method available whereby the height of cut of the mowing device may be adjusted. According to this invention the height of cut is adjusted by altering the height relationship of a supporting wheel or wheels of a mowing device to the mowing device itself. This has the advantage of allowing the mower cutter and its drive to be fixedly mounted on the mower frame.

An object of the invention is to provide such a device in which the height adjustment may be more rapidly and easily made than has heretofore been possible.

Another object of the invention is to provide such a wheel height adjustment device which is sturdy and dependable in use, safe, and which may be manufactured at low cost.

According to the invention there is provided a wheel height adjustment device having two elements mutually engageable in a variety of height positions whereby adjustment of the height position of said elements provides height adjustment between a device, e. g. mowing device, secured to one of said elements and a wheel on the other element.

More specifically, a wheel element has a pair of perforated prong elements which are received in variable height positions between a series of vertically-spaced perforated flanges on a support element secured to a wheeled vehicle, a pin or bolt being received through the perforations of both elements to connect them together. The important advantage of such an arrangement is that the adjustment is made merely by removing a pin, removing the wheel, replacing the wheel at a different height, and reinserting the pin.

A still further object of the invention is to provide a mowing device having such a wheel height adjustment device whereby the height of cut of said mowing device may be adjusted by adjusting the wheel height.

Other objects, uses, advantages, and improvements of the invention will be apparent from the specification, claims and drawings, of which:

Figure 1 shows a side elevational view of a preferred embodiment of the invention in a mowing device adapted to be attached to and pulled by a tractor;

Figure 2 shows, in perspective, the support and wheel bearing elements of the device separated apart as when a wheel height adjustment is made;

Figure 3 shows a partial top plan view of the preferred embodiment and mowing device shown in Figure 1, and is taken at line 3—3 of Figure 1;

Figure 4 shows a side view of the preferred embodiment of the invention; and,

Figure 5 shows a top view of the preferred embodiment of the invention.

Referring now in detail to the drawings, Figures 1 and 3 show a preferred embodiment of the invention used in a mowing device. The wheel height adjustment device has a wheel element 1 which carries a wheel 2 and a support element 3 which is secured to the mowing device 4 pulled by a tractor 5 or other vehicle and to which the wheel element is connected by means of a pin 6.

Referring now to Figures 2, 4, and 5, wheel element 1 has two diagonally downwardly extending prongs 7 at the lower end of which is attached a wheel 2 received between the two prongs 7. A bolt 8 having nut 9 screwed thereon passes through the center of wheel 2, and through both prongs 7 to secure the wheel to the prongs so that the wheel can rotate and roll on the ground. At their upper ends both prongs 7 bend inwardly to an arm portion 10. In the preferred embodiment the prongs each have two inward bends as shown at 11 and 12, but they may take other forms. The arm portion 10 is a vertical flat plate either formed integrally with the prongs 7 or welded thereto, and has a pentagonal shape such that one edge 13 flushly meets the juncture of the diagonal prongs 7 and an opposite side 14 is vertical. At the vertical side of arm portion 10 upper and lower horizontal arm extensions 15 and 16, respectively, have horizontal rings or loops 17 and 18 formed thereon through which a vertical pin or bolt may be inserted.

Still referring to Figures 2, 4, and 5, of the drawings, support element 3 has a relatively narrow web portion 19 on which are formed a vertical series of horizontal perforated flanges 20 or loops which are equally spaced apart along the vertical length of web portion 19 and which have their perforations in vertical alignment so that a pin or bolt may be inserted through the perforations. Preferably the perforations are the circular holes 21 as shown in Figure 2, but they may take other forms as well. A triangular brace 22 is provided at upper part of web portion 19 opposite flanges 20. The brace 22 reinforces the web portion 19 and in addition adds vertical strength to the support and wheel elements.

The support element 3 is usually welded onto the mowing device or other vehicle but may be attached thereto in any other suitable manner, as by bolts or rivets. The web portion 19 may be adapted to fit substantially any type of vehicle. Referring again to Figures 2 and 4, the loops 17 and 18 are spaced apart and have a thickness such that they are received between the flanges 20 as best shown in Figure 4. The openings through loops 17 and 18 are of substantially the same size as the holes 21 in flanges 20, and can be aligned therewith to receive a pin 6 or a bolt which securely connects wheel element 1 to support element 3. The pin 6 provides a secure connection between the wheel element and the support element and the wheel element may be pivoted about the connection and thereby is adapted to serve as a follower wheel. In the preferred embodiment shown, a total of eight wheel height positions are possible, including six positions in which the loops 17 and 18 are between the flanges 20 and two positions in which loop 17 or 18 is above or below, respectively, the top or bottom flange 20. When the invention is incorporated into a mowing device as shown and described herein, the height of cut of the mowing device may be easily adjusted to correspond to each of the eight wheel height positions, the invention thereby providing great flexibility in the mowing device.

Both the support element and the wheel element may take a variety of forms. The wheel element may have one wheel or may have a plurality of wheels. Two or more support elements may engage two or more sets of loops on the wheel element. Many other modifications to the invention may be made by a person skilled in the art without departing from the spirit thereof, and it is

I claim:

1. A wheel height adjustment device comprising a vertical bar mounted flushly against a vehicle body wall and having a plurality of equally vertically spaced-apart perforated flanges extending horizontally therefrom perpendicular to said wall, a wheeled member having at least one loop element received in the space between any two adjacent flanges of said plurality of flanges in register with said perforations, a pin means received through said perforations and loop to form a pivotal connection therebetween, the position of said wheeled member relative to said vehicle body wall along a vertical line being adjustable by moving said loop element to the said space between other two adjacent flanges of said plurality of flanges.

2. The combination of claim 1, said wheeled member having two of said loop elements vertically spaced apart and engaged between non-adjacent spaces between flanges of said plurality of vertically equally spaced flanges, whereby the said loops are spaced apart to strengthen said pivotal connection against rotative moments in vertical planes through the axis of said pin means.

3. In combination with a wheel-mounted mower having a vertical body side, a wheel height adjustment device comprising a vertically elongated element mounted flush against said body side and having a plurality of equally vertically spaced apart perforated flanges extending horizontally therefrom perpendicular to said body side, a wheel mount having at least one horizontal loop extending laterally therefrom above the level of the wheel axis and engaged between any two adjacent flanges of said plurality of flanges, and means received axially through said perforations and loops for preventing removal of said loops from between the two adjacent flanges, whereby said wheel mount is adjustable along a vertical line parallel with said side by moving said loop to a position between other adjacent flanges of said plurality of flanges.

4. The combination of claim 3, there being two of said loops spaced apart vertically and engaged with non-adjacent spaces between pairs of said plurality of flanges, whereby said wheel mount is pivotally interconnected with said vertically elongated element at points vertically spaced-apart therealong to provide a connection highly resistant to moments acting in planes through the vertical axis of said axially receivable means.

References Cited in the file of this patent

UNITED STATES PATENTS

| | | |
|---|---|---|
| 128,087 | Wright | June 18, 1872 |
| 1,794,630 | Linn | Mar. 3, 1931 |
| 2,564,201 | Hainke | Aug. 14, 1951 |
| 2,763,116 | Flinchbaugh | Sept. 18, 1956 |